US009813705B2

(12) United States Patent
Wang

(10) Patent No.: US 9,813,705 B2
(45) Date of Patent: Nov. 7, 2017

(54) PARAMETER SET CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 13/870,548

(22) Filed: Apr. 25, 2013

(65) Prior Publication Data

US 2013/0287115 A1    Oct. 31, 2013

Related U.S. Application Data

(60) Provisional application No. 61/638,999, filed on Apr. 26, 2012.

(51) Int. Cl.
*H04N 7/30* (2006.01)
*H04N 19/645* (2014.01)
*H04N 19/70* (2014.01)
*H04N 19/463* (2014.01)

(52) U.S. Cl.
CPC ..... *H04N 19/00836* (2013.01); *H04N 19/463* (2014.11); *H04N 19/70* (2014.11)

(58) Field of Classification Search
CPC ............. H04N 19/70; H04N 19/00836; H04N 19/463; H04N 7/30
See application file for complete search history.

(56) References Cited

U.S. PATENT DOCUMENTS

2009/0219989 A1   9/2009 Tanaka et al.
2009/0279612 A1   11/2009 Pandit et al.
(Continued)

FOREIGN PATENT DOCUMENTS

CN   101461246 A   6/2009
CN   101485208 A   7/2009
(Continued)

OTHER PUBLICATIONS

Skupin et al., ("Generic HEVC High Level Syntax for Scalability and Adaptation", MPEG Meeting; Apr. 30, 2012-May 4, 2012; Geneva; (Motion Picture Expert Group or 150/IEC JTC1/SC29/WG11), No. m24458, XP030052801, 6 pp.*
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
(Continued)

*Primary Examiner* — Dave Czekaj
*Assistant Examiner* — Berteau Joisil
(74) *Attorney, Agent, or Firm* — Shumaker & Sieffert, P.A.

(57) ABSTRACT

Systems, methods, and devices for processing video data are disclosed. Some examples relate to receiving or forming a parameter set having an identifier that is fixed length coded, wherein a parameter set identification (ID) for the parameter set is before any syntax element in the parameter set that is entropy coded and using the parameter set having the identifier that is fixed length coded to decode or encode video data. Other examples determine whether a first parameter set ID of a first parameter set of a first bitstream is the same as a second parameter set ID of a second parameter set of a second bitstream. In response to determining that the second parameter set ID is the same as the first parameter set ID, changing the second parameter set ID to a unique parameter set ID. A parameter set associated with the unique parameter set ID may be transmitted.

46 Claims, 10 Drawing Sheets

(56) References Cited

U.S. PATENT DOCUMENTS

| | | | |
|---|---|---|---|
| 2010/0091881 A1 | 4/2010 | Pandit et al. | |
| 2012/0128151 A1* | 5/2012 | Boehm | H04L 65/602 380/42 |
| 2012/0170648 A1 | 7/2012 | Chen et al. | |
| 2013/0114742 A1 | 5/2013 | Hannuksela et al. | |
| 2013/0188738 A1* | 7/2013 | Hannuksela | H04N 19/46 375/240.25 |
| 2013/0194384 A1 | 8/2013 | Hannuksela et al. | |
| 2013/0243080 A1 | 9/2013 | Leontaris et al. | |
| 2013/0272372 A1* | 10/2013 | Hannuksela | H04N 19/00 375/240.01 |

FOREIGN PATENT DOCUMENTS

| | | |
|---|---|---|
| CN | 101569197 A | 10/2009 |
| JP | 2005123907 A | 5/2005 |
| JP | 2008011518 A | 1/2008 |
| WO | 2007142281 A2 | 12/2007 |
| WO | 2011015369 A1 | 2/2011 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2013/038382, The International Bureau of WIPO—Geneva, Switzerland, Aug. 22, 2014, 10 pp.

International Search Report and Written Opinion—PCT/US2013/038382—ISA/EPO—Sep. 10, 2013, 18 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Partial International Search Report—PCT/US2013/038382—ISA/EPO—Jul. 16, 2013, 6 pp.

Skupin, et al., "Generic HEVC High Level Syntax for Scalability and Adaptation", MPEG Meeting; Apr. 30, 2012-May 4, 2012; Geneva; (Motion Picture Expert Group or 150/IEC JTC1/SC29/WG11), No. m24458, XP030052801, 6 pp.

Stockhammer, "DASH: Sub segment Alignment Fixes when used with StartWithSAP", MPEG Meeting; Jul. 18, 2011-Jul. 22, 2011; Torino; (Motion Picture Expert Group or ISO/IEC JTC1/SC29/WG11), No. m21430, XP030049993, 10 pp.

Wang, et al., "AHG9: Splicing-Friendly Coding of Some Parameters", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0108, XP030112470, 5 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/038382, dated Jul. 6, 2014, 9 pp.

Boyce et al., "Extensible High Layer Syntax for Scalability," JCT-VC Meeting; Mar. 16-23, 2011; Geneva, CH (Joint Collaborative Team on Video Coding of ISO/IEC JTC1/SC29/WG11 and ITU-T SG.16); URL: http://WFTP3.ITU.Int/Av-Arch(JCTVC-Site/, No. JCTVC-E279, Mar. 11, 2011, 10 pp.

* cited by examiner

PARAMETER SET CODING

This application claims the benefit of:
U.S. Provisional Application No. 61/638,999, filed Apr. 26, 2012, the entire content of which is incorporated herein by reference.

TECHNICAL FIELD

This disclosure generally relates to processing video data and, more particularly, relates to signaling overhead data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to splicing two bitstreams while also ensuring that a decoder is capable of differentiating between parameter sets of the spliced bitstreams. For instance, this disclosure describes techniques for coding one or more parameter set identifiers (IDs) using fixed-length codes and techniques for low-complexity splicing of video bitstreams for which at least one type of parameter set can be transported out-of-band. In some examples, this may permit out-of-band transport of parameter sets following splicing of two bitstreams, even when the two bitstreams included parameter sets having the same parameter set IDs prior to splicing. A "bitstream" as used in this disclosure refers to a sequence of bits that may form the representation of coded pictures and associated data forming one or more coded video sequences. Bitstream can be a collective term used to refer either to a NAL unit stream or a byte stream.

In one example, the disclosure describes a method of decoding video data that includes receiving a parameter set having a parameter set identifier (ID) that is fixed length coded, wherein the parameter set ID for the parameter set is before any syntax element in the parameter set that is entropy coded, and using the parameter set having the identifier that is fixed length coded to decode video data.

In another example, the disclosure describes a method of encoding video data that includes forming a parameter set having a parameter set ID that is fixed length coded, wherein the parameter set ID for the parameter set is before any syntax element in the parameter set that is entropy coded, and using the parameter set having the identifier that is fixed length coded to encode video data.

In another example, the disclosure describes an apparatus for processing video data that includes one or more processors configured to process a parameter set having a parameter set ID that is fixed length coded, wherein the parameter set ID for the parameter set is before any syntax element in the parameter set that is entropy coded, and use the parameter set having the identifier that is fixed length coded to code video data.

In another example, the disclosure describes an apparatus for processing video data that includes means for processing a parameter set having a parameter set ID that is fixed length coded, wherein the parameter set ID for the parameter set is before any syntax element in the parameter set that is entropy coded, and means for using the parameter set having the identifier that is fixed length coded to code video data.

In another example, the disclosure describes a computer-readable storage medium. The computer-readable storage medium having stored thereon instructions that upon execution cause one or more processors of a device to process a parameter set having a parameter set ID that is fixed length coded, wherein the parameter set ID for the parameter set is before any syntax element in the parameter set that is entropy coded, and use the parameter set having the identifier that is fixed length coded to code video data.

In another example, the disclosure describes a method of processing video data that includes determining whether a first parameter set identifier (ID) of a first parameter set of a first bitstream is the same as a second parameter set ID of a second parameter set of a second bitstream, in response to determining that the second parameter set ID is the same as the first parameter set ID, changing the second parameter set ID to a unique parameter set ID, and transmitting a parameter set associated with the unique parameter set ID.

In another example, the disclosure describes an apparatus for processing video data that includes one or more processors configured to determine whether a first parameter set ID of a first parameter set of a first bitstream is the same as a second parameter set ID of a second parameter set of a second bitstream, in response to determining that the second parameter set ID is the same as the first parameter set ID, changing the second parameter set ID to a unique parameter set ID, and transmit a parameter set associated with the unique parameter set ID.

In another example, the disclosure describes an apparatus for processing video data that includes means for determining whether a first parameter set ID of a first parameter set of a first bitstream is the same as a second parameter set ID of a second parameter set of a second bitstream, means for changing second the parameter set ID to a unique parameter set ID in response to determining that the second parameter set ID is the same as the first parameter set ID, and means for transmitting a parameter set associated with the unique parameter set ID.

In another example, the disclosure describes a computer-readable storage medium. The computer-readable storage medium having stored thereon instructions that upon execution cause one or more processors of a device to determine whether a first parameter set ID of a first parameter set of a first bitstream is the same as a second parameter set ID of a second parameter set of a second bitstream, in response to determining that the second parameter set ID is the same as the first parameter set ID, change the second parameter set ID to a unique parameter set ID, and transmit a parameter set associated with the unique parameter set ID.

The details of one or more examples are set forth in the accompanying drawings and the description below. Other features, objects, and advantages will be apparent from the description and drawings, and from the claims.

DETAILED DESCRIPTION

Figure 1:
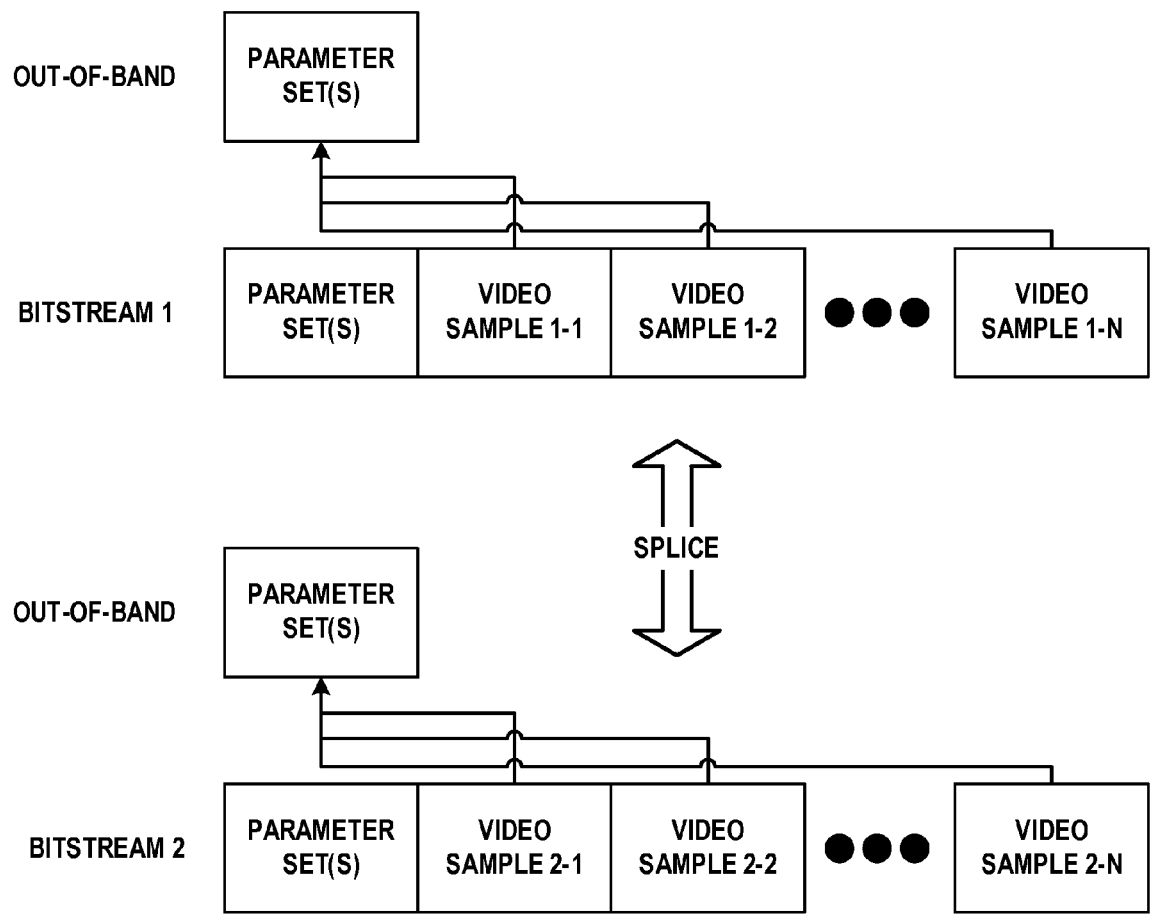
FIG. 1 is a block diagram illustrating an example of splicing two bitstreams in which some parameter set information is transmitted out-of-band relative to transmission of the bitstreams and some parameter set information is transmitted as part of the bitstreams.

This disclosure describes techniques related to splicing two bitstreams while also ensuring that a decoder is capable of differentiating between parameter sets of the spliced bitstreams. For instance, this disclosure describes techniques for coding one or more parameter set identifiers (IDs) using fixed-length codes and techniques for low-complexity splicing of video bitstreams for which at least one type of parameter set can be transported out-of-band. In some examples, this may permit out-of-band transport of parameter sets following splicing of two bitstreams, even when the two bitstreams included parameter sets having the same parameter set IDs prior to splicing. A "bitstream" as used in this disclosure refers to a sequence of bits that may form the representation of coded pictures and associated data forming one or more coded video sequences. Bitstream can be a collective term used to refer either to a NAL unit stream or a byte stream.

The emerging High Efficiency Video Coding (HEVC) standard employs the parameter set concept. The sequence parameter set (SPS), picture parameter set (PPS), and video parameter set (VPS) mechanism in HEVC may decouple the transmission of infrequently changing information from the transmission of coded video block data. Sequence, picture, and video parameter sets may, in some applications, be conveyed "out-of-band," i.e., not transported together with the units containing coded video data. Out-of-band transmission is typically reliable.

In HEVC, an identifier of SPS picture, PPS, or VPS is coded using the variable-length encoding coding method named 'ue(v)'. The HEVC working draft defines 'ue(v)' coded syntax elements as unsigned integer Exp-Golomb-coded syntax elements with the left bit first. Each SPS includes an SPS ID, each PPS includes a PPS ID and an SPS ID, and each slice header includes a PPS ID. Each buffering period supplemental enhancement information (SEI) message also includes an SPS ID. In general, a video coding device or a video processing device may encapsulate data of a bitstream within network abstraction layer (NAL) units. NAL units include video coding layer (VCL) NAL units and non-VCL NAL units. VCL NAL units generally include information used by a video coder, such as coded video data and parameter sets, e.g., SPSs, PPSs, and VPSs. Non-VCL NAL units include information defining SEI messages, which may contain information that is not necessary for decoding the coded pictures samples from VCL NAL units, but may assist in processes related to decoding, display, error resilience, and other purposes.

Bitstream splicing generally refers to the combination of two or more bitstreams or parts thereof. For example, a video coding device or a video processing device may append a first bitstream to a second bitstream, possibly with some modifications to either one or both of the bitstreams to generate a spliced bitstream. The first coded picture in the second bitstream is also referred to as the splicing point. Therefore, the picture at the splicing point in the spliced bitstream was originated from the second bitstream while the picture immediately preceding the splicing point in the spliced bitstream was originated from the first bitstream. For the purpose of illustration, the following description assumes that there is only one splicing point in the spliced bitstream. However, the techniques of this description may also be applied to spliced bitstreams with multiple splicing points as well, e.g., by applying the described techniques to two or more splicing points individually.

FIG. 1 is a conceptual diagram illustrating an example of splicing two bitstreams 1 and 2, in which some parameter set information is transmitted out-of-band relative to transmission of the bitstreams, while the rest of the parameter set information is transmitted as part of the bitstreams. In this example, some of the PPSs, SPSs, and VPSs, if provided, may be transmitted out-of-band relative to transmission of the bitstreams. Additionally, some of the PPSs, SPSs, and VPSs may be included in the beginning of the bitstream, followed by a series of video samples (e.g., network abstraction layer (NAL) units including encoded video data). In another example, a video coding device or a video processing device may transmit all of the PPSs, SPSs, and VPSs with the bitstream. In another example, all of the PPSs, SPSs, and VPSs may be transmitted out-of-band relative to transmission of the bitstreams. The video samples can include pictures in a sequence of temporally related pictures or portions thereof, e.g., slices or blocks.

Figure 2:
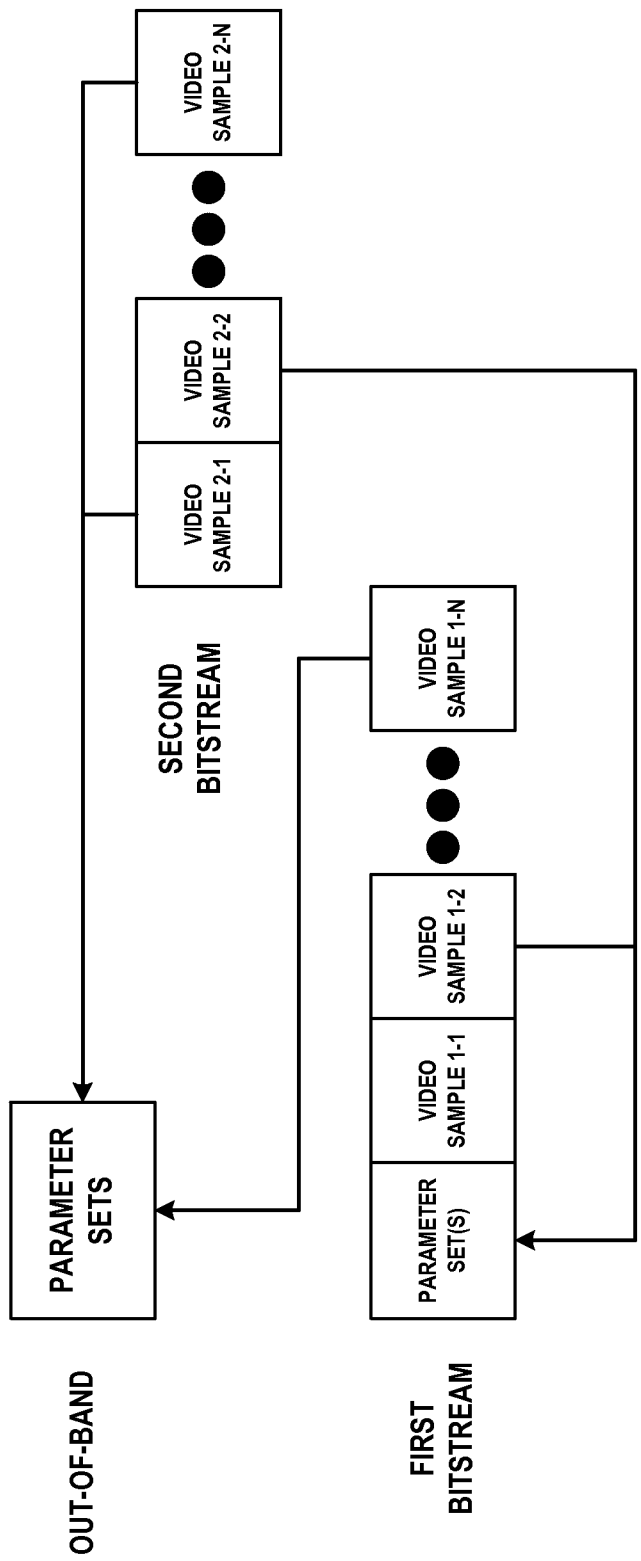
FIG. 2 is a block diagram illustrating bitstreams 1 and 2 spliced together into a single bitstream forming the results of the splicing operation illustrated in FIG. 1.

FIG. 2 is a conceptual diagram illustrating the results of the splicing operation illustrated in FIG. 1. In FIG. 2, bitstreams 1 and 2 have been spliced together into a single bitstream. In some examples, this may be done by a video coding device or a video processing device. The beginning of bitstream 2 immediately follows the last video sample 1-N of bitstream 1. Thus, the first video sample 2-1 of bitstream 2 immediately follows the last video sample 1-N of bitstream 1. A video coding device or a video processing device may combine out-of-band and in-band parameter set information for the spliced bitstream. Thus, as illustrated in FIG. 2, at least some of the video samples from each of the bitstreams 1 and 2 may reference the same out-of-band parameter set ID and some of the video samples from each of the bitstreams 1 and 2 reference the same in-band parameter sets at the beginning of the spliced bitstream.

Bitstreams of coded video data often include relatively few SPSs and few PPSs, or even just one SPS and one PPS, and use the smallest SPS ID value 0 and the smallest PPS ID value 0. Thus, if two bitstreams or parts thereof are spliced, it is possible or even likely that the same SPS or PPS ID referred to by the splicing point will be the same as the SPS or PPS ID referred to by the picture immediately preceding the splicing point, even though the splicing point and the picture preceding the splicing points are actually referring to two different SPSs or PPSs. For simplicity, aspects of this disclosure may be described in relation to an SPS only, but the techniques described are generally also applicable to PPS, APS, or any other type of parameter set.

In instances when the same SPS ID is referred to by the splicing point picture and the picture immediately preceding the splicing point even though each is referencing a different SPS, then in the spliced bitstream, the SPS with that particular SPS ID referred to by the picture immediately preceding the splicing point is effectively updated by the SPS referred to by the splicing point picture. In such a case, SPSs of the spliced bitstream cannot be put in the beginning of the spliced bitstream, and out-of-band transmission of SPSs may be difficult or even impossible. However, as only a few different SPSs are used anyway, it may be beneficial to enable out-of-band transmission of SPSs for the spliced bitstream.

This disclosure describes techniques that include modifying a bitstream of coded video data in order to enable out-of-band transmission of SPSs (or other types of parameter sets, e.g., PPSs and/or VPSs) for spliced bitstreams, which may overcome some of the shortcomings described above. As one example, if the number of different parameter sets of a particular type included in the spliced bitstream is less than or equal to a maximum number of allowed parameter sets of the particular type, then the following techniques may be applied (otherwise, parameter sets of the particular type cannot be out-of-band transmitted). For each parameter set of a particular type (e.g. SPS, PPS, or VPS) included in the second bitstream of a splicing point, if the parameter set ID of a first parameter set of a first bitstream is the same as any of the parameter set IDs for the same parameter set type, then a video coding device or a video processing device changes the value of the parameter set ID to a unique value among all parameter sets of the same type included in the spliced bitstream. After the above step, a video coding device or a video processing device may transmit parameter sets of the type out-of-band. The video coding device or video processing device may place parameter sets in the beginning of the bitstream.

In changing of the value of a parameter set ID, when the ID is entropy coded (e.g., using 'ue(v)'), then a video coding device or a video processing device may shift all bits after the ID in the data unit. This can be a cumbersome process, as a video coding device or a video processing device may need to perform this operation for all coded data units referring to that ID. To simplify the process for changing the parameter set ID values, techniques of this disclosure include coding the parameter set ID using fixed-length codes, including both the ID in the parameter set itself and the places where it is referred (e.g., within slice headers of slices encapsulated within NAL units). The length, in bits, can be equal to Ceil(log 2(N)), where N is the maximum number of allowed parameter sets of the particular type. For example, if the maximum number of allowed SPSs is 32, then SPS IDs are coded using 5 bits.

Techniques of this disclosure may additionally include placing the parameter set IDs as early as possible in coded data units, for example, before any entropy coded data. In some instances, the parameter set ID values may start with 1 instead of 0, to avoid start code emulation. Start code emulation may occur, for example, when a parameter set ID has a value 0. When the value of a parameter set is 0 all bits are of 0. This may increases the chance of start code emulation because a start code may be a fixed-value sequence of 3 bytes equal to 0x000001, which contains several O-valued bits.

The following tables show example syntaxes for HEVC involving SPS ID, PPS ID, APS ID, and VPS ID. For purposes of these examples, it can be assumed that the maximum number of allowed parameter sets for each type is equal to 32, although other maximums may also be used. That is, in the examples below, the various ID values are coded using u(5) descriptors, indicating that five bits are allocated to the ID values. However, in other examples, other numbers of bits may be allocated to the ID values.

Table 1 shows an example of SPS raw byte sequence payload (RBSP) syntax according to the techniques of this disclosure:

TABLE 1

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | u(5) |
| chroma_format_idc | ue(v) |
| ... | |

As illustrated in Table 1, in one example, seq_parameter_set_id may use the descriptor u(5) rather than ue(v). The descriptor u(5) indicates that 5 bits are used to signal the syntax element. The descriptor ue(v) indicates a variable number of bits may be used. In changing of the value of a parameter set ID, when the ID is entropy coded (e.g., using 'ue(v)'), then shifting of all bits after the ID in the data unit would be needed. This is cumbersome, as potentially this operation is needed for all coded data units referring to that ID. To simply the process for changing the parameter set ID values, coding the parameter set ID using fixed-length codes may be used. This may include both the ID in the parameter set itself and the places where it is referred to. The length, in bits, is equal to Ceil(log 2(N)), where N is the maximum number of allowed parameter sets of the particular type. For example, if the maximum number of allowed SPSs is 32, then SPS IDs are coded using 5 bits. Accordingly, in the example of Table 1, 5 bits are used to signal the syntax element seq_parameter_set_id. Limiting the number of bits to 5 ("u(5)"), rather than using a variable number of bits ("ue(v)") simplifies the process for changing the parameter set ID values. It will be understood that other fixed numbers of bits may be used.

Table 2 shows another example of SPS RBSP syntax according to the techniques of this disclosure.

TABLE 2

| seq_parameter_set_rbsp( ) { | Descriptor |
|---|---|
| seq_parameter_set_id | u(5) |
| profile_idc | u(8) |
| reserved_zero_8bits /* equal to 0 */ | u(8) |
| level_idc | u(8) |
| chroma_format_idc | ue(v) |
| ... | |

As illustrated in Table 2, in one example, seq_parameter_set_id may use the descriptor u(5) rather than ue(v). Again, limiting the number of bits to 5 ("u(5)"), rather than using a variable number of bits ("ue(v)") simplifies the process for changing the parameter set ID values. Additionally, as illustrated in Table 2, seq_parameter_set_id is preferably placed as early as possible in coded data units to allow for non-entropy encoding.

Table 3 shows an example of PSP RBSP syntax according to the techniques of this disclosure.

TABLE 3

| pic_parameter_set_rbsp( ) { | Descriptor |
|---|---|
| pic_parameter_set_id | u(5) |
| seq_parameter_set_id | u(5) |
| sign_data_hiding_flag | u(1) |
| ... | |

As illustrated in Table 3, in one example, pic_parameter_set_id and seq_parameter_set_id may use the descriptor u(5) rather than ue(v). Again, limiting the number of bits to 5 ("u(5)"), rather than using a variable number of bits ("ue(v)") simplifies the process for changing the parameter set ID values. Additionally, as illustrated in Table 3, seq_parameter_set_id is preferably placed as early as possible in coded data units may allow for non-entropy encoding.

Table 4 shows an example of APS RBSP syntax according to the techniques of this disclosure.

TABLE 4

| aps_rbsp( ) { | Descriptor |
|---|---|
| aps_id | u(5) |
| aps_scaling_list_data_present_flag | u(1) |
| ... | |

Again, as illustrated in Table 4, in one example, aps_id may use the descriptor u(5) rather than ue(v) to simplify the process for changing the parameter set ID values. Placing aps_id as early as possible in coded data units may allow for non-entropy encoding.

Table 5 shows an example of slice header syntax according to the techniques of this disclosure.

TABLE 5

| slice_header( ) { | Descriptor |
|---|---|
| first_slice_in_pic_flag | u(1) |
| pic_parameter_set_id | u(5) |
| if( scaling_list_enable_flag \|\| | |
|     deblocking_filter_in_aps_enabled_flag \|\| | |
|     ( sample_adaptive_offset_enabled_flag && | |
| !slice_sao_interleaving_flag ) \|\| | |
|     adaptive_loop_filter_enabled_flag ) | |
|     aps_id | u(5) |
| if( first_slice_in_pic_flag = = 0 ) | |
|     slice_address | u(v) |
| slice_type | ue(v) |
| entropy_slice_flag | u(1) |
| if( !entropy_slice_flag ) { | |
|     if( output_flag_present_flag ) | |
|         pic_output_flag | u(1) |
|     if( separate_colour_plane_flag = = 1 ) | |
|         colour_plane_id | u(2) |
|     if( IdrPicFlag ) { | |
|         idr_pic_id | ue(v) |
|         no_output_of_prior_pics_flag | u(1) |
|     } else { | |
|         pic_order_cnt_lsb | u(v) |
|         short_term_ref_pic_set_sps_flag | u(1) |
|         if( !short_term_ref_pic_set_sps_flag ) | |
|     short_term_ref_pic_set( | |
|     num_short_term_ref_pic_sets ) | |
|         else | |
|             short_term_ref_pic_set_idx | u(v) |
|         if( long_term_ref_pics_present_flag ) { | |
|             num_long_term_pics | ue(v) |
|             for( i = 0; i < num_long_term_pics; i++ ) { | |
|                 delta_poc_lsb_lt[ i ] | ue(v) |
|                 delta_poc_msb_present_flag[ i ] | u(1) |
|                 if( delta_poc_msb_present_flag[ i ] ) | |
|                     delta_poc_msb_cycle_lt_minus1[i] | ue(v) |
|                 used_by_curr_pic_lt_flag[ i ] | u(1) |
|             } | |
|         } | |
|     } | |
|     if( sample_adaptive_offset_enabled_flag ) { | |
|         slice_sao_interleaving_flag | u(1) |
|         slice_sample_adaptive_offset_flag | u(1) |
|         if( slice_sao_interleaving_flag && | |
|             slice_sample_adaptive_offset_flag ) | |
|     { | |
|             sao_cb_enable_flag | u(1) |
|             sao_cr_enable_flag | u(1) |
|         } | |
|     } | |
|     if( slice_type = = P \|\| slice_type = = B ) { | |
|     ... | |

Again, as illustrated in Table 5, in one example, pic_parameter_set_id and aps_id may use the descriptor u(5) rather than ue(v) to simplify the process for changing the parameter set ID values. Placing them as early as possible in coded data units may allow for non-entropy encoding.

Table 6 shows another example of slice header syntax according to the techniques of this disclosure.

TABLE 6

| slice_header( ) { | Descriptor |
|---|---|
| first_slice_in_pic_flag | u(1) |
| aps_id | u(5) |

TABLE 6-continued

| slice_header( ) { | Descriptor |
|---|---|
| pic_parameter_set_id | u(5) |
| if( first_slice_in_pic_flag == 0 ) | |
| slice_address | u(v) |
| slice_type | ue(v) |
| ... | |

Again, as illustrated in Table 6, in one example, pic_parameter_set_id and aps_id may use the descriptor u(5) rather than ue(v) to simplify the process for changing the parameter set ID values. Placing them as early as possible in coded data units may allow for non-entropy encoding.

In the example of Table 6, each APS is required to have APS ID greater than 0, and the aps_id in the slice header equal to 0 means that no APS is referred to by the slice header, and the aps_id in the slice header shall be equal to 0 when the following condition does not hold, otherwise, the aps_id shall not be zero:
  if (scaling_list_enable_flag||
  deblocking_filter_in_aps_enabled_flag||
  (sample_adaptive_offset_enabled_flag && ! slice_sao_interleaving_flag)||
  adaptive_loop_filter_enabled_flag)

In this example, the pic_parameter_set_id is also required to be greater than 0. This may be achieved by requiring that each PPS has PPS ID greater than 0.

Table 7 shows another example of slice header syntax according to the techniques of this disclosure.

TABLE 7

| slice_header( ) { | Descriptor |
|---|---|
| aps_id | u(5) |
| pic_parameter_set_id | u(5) |
| first_slice_in_pic_flag | u(1) |
| if( first_slice_in_pic_flag == 0 ) | |
| slice_address | u(v) |
| slice_type | ue(v) |
| ... | |

Again, as illustrated in Table 7, in one example, pic_parameter_set_id and aps_id may use the descriptor u(5) rather than ue(v) to simplify the process for changing the parameter set ID values. Placing them as early as possible in coded data units may allow for non-entropy encoding.

Table 8 shows an example of buffering period SEI message syntax according to the techniques of this disclosure.

TABLE 8

| buffering_period( payloadSize ) { | Descriptor |
|---|---|
| seq_parameter_set_id | u(5) |
| if( NalHrdBpPresentFlag ) { | |
| for( SchedSelIdx = 0; SchedSelIdx <= cpb_cnt_minus1; SchedSelIdx++ ) { | |
| initial_cpb_removal_delay[ SchedSelIdx ] | u(v) |
| initial_cpb_removal_delay_offset[ SchedSelIdx ] | u(v) |
| } | |
| } | |
| if( VclHrdBpPresentFlag ) { | |
| for( SchedSelIdx = 0; SchedSelIdx <= cpb_cnt_minus1; SchedSelIdx++ ) { | |
| initial_cpb_removal_delay[ SchedSelIdx ] | u(v) |
| initial_cpb_removal_delay_offset[ SchedSelIdx ] | u(v) |
| } | |
| } | |
| } | |

Again, as illustrated in Table 8, in one example, seq_parameter_set_id aps_id may use the descriptor u(5) rather than ue(v) to simplify the process for changing the parameter set ID values. Placing them as early as possible in coded data units to allow for non-entropy encoding.

Table 9 shows an example of sequence of pictures (SOP) description SEI message syntax according to the techniques of this disclosure.

TABLE 9

| sop_description( payloadSize ) { | Descriptor |
|---|---|
| sps_id | u(5) |
| num_pics_in_sop_minus1 | ue(v) |
| for( i = 0; i <= num_pics_in_sop_minus1; i++ ) { | |
| sop_desc_nal_ref_flag[ i ] | u(1) |
| sop_desc_temporal_id[ i ] | u(3) |
| st_rps_idx[ i ] | ue(v) |
| if( i > 0 ) | |
| poc_delta[ i ] | se(v) |
| } | |
| } | |

Again, as illustrated in Table 9, in one example, sps_id may use the descriptor u(5) rather than ue(v) to simplify the process for changing the parameter set ID values. Placing them as early as possible in coded data units to allow for non-entropy encoding.

Table 10 shows an example of video parameter set RBSP syntax according to the techniques of this disclosure.

TABLE 10

| video_parameter_set_rbsp( ) { | Descriptor |
|---|---|
| vps_video_parameter_set_id | u(4) |
| vps_reserved_three_2bits | u(2) |
| vps_max_layers_minus1 | u(6) |
| vps_max_sub_layers_minus1 | u(3) |
| vps_temporal_id_nesting_flag | u(1) |
| vps_reserved_0xffff_16bits | u(16) |
| profile_tier_level( vps_max_sub_layers_minus1 ) | |
| vps_sub_layer_ordering_info_present_flag | u(1) |
| for( i = ( vps_sub_layer_ordering_info_present_flag ? 0 : vps_max_sub_layers_minus1 ); i <= vps_max_sub_layers_minus1; i++ ) { | |
| vps_max_dec_pic_buffering_minus1[ i ] | ue(v) |
| vps_max_num_reorder_pics[ i ] | ue(v) |
| vps_max_latency_increase_plus1[ i ] | ue(v) |
| } | |
| vps_max_layer_id | u(6) |
| vps_num_layer_sets_minus1 | ue(v) |
| for( i = 1; i <= vps_num_layer_sets_minus1; i++ ) | |
| for( j = 0; j <= vps_max_layer_id; j++ ) | |
| layer_id_included_flag[ i ][ j ] | u(1) |
| vps_timing_info_present_flag | u(1) |
| if( vps_timing_info_present_flag ) { | |
| vps_num_units_in_tick | u(32) |
| vps_time_scale | u(32) |
| vps_poc_proportional_to_timing_flag | u(1) |
| if( vps_poc_proportional_to_timing_flag ) | |
| vps_num_ticks_poc_diff_one_minus1 | ue(v) |
| vps_num_hrd_parameters | ue(v) |
| for( i = 0; i < vps_num_hrd_parameters; i++ ) { | |
| hrd_layer_set_idx[ i ] | ue(v) |
| if( i > 0 ) | |
| cprms_present_flag[ i ] | u(1) |
| hrd_parameters( cprms_present_flag[ i ], vps_max_sub_layers_minus1 ) | |
| } | |
| } | |
| vps_extension_flag | u(1) |
| if( vps_extension_flag ) | |
| while( more_rbsp_data( ) ) | |

TABLE 10-continued

| video_parameter_set_rbsp( ) { | Descriptor |
|---|---|
|     vps_extension_data_flag | u(1) |
|   rbsp_trailing_bits( ) | |
| } | |

Again, as illustrated in Table 10, in one example, vps_video_parameter_set_id may use the descriptor u(4) rather than ue(v) to simplify the process for changing the parameter set ID values. Placing them as early as possible in coded data units to allow for non-entropy encoding.

According to techniques of this disclosure, a buffering period SEI messages and SOP description SEI messages, when present, may be placed as early as possible in SEI network abstraction layer (NAL units), including as the first SEI message in SEI NAL units.

In addition to the foregoing syntax structures referencing parameter sets and IDs thereof, syntax structures for buffering period SEI messages and SOP description SEI messages may also refer to parameter sets and parameter set IDs. These SEI messages may therefore also employ the fixed-length coding techniques for parameter set IDs used in the other syntax structures described above. In some examples, buffering period and SOP description SEI messages, when present, are placed as early as possible in SEI NAL units. In one example, a video coding device or a video processing device place such SEI messages as the first SEI message in SEI NAL units.

Figure 3:
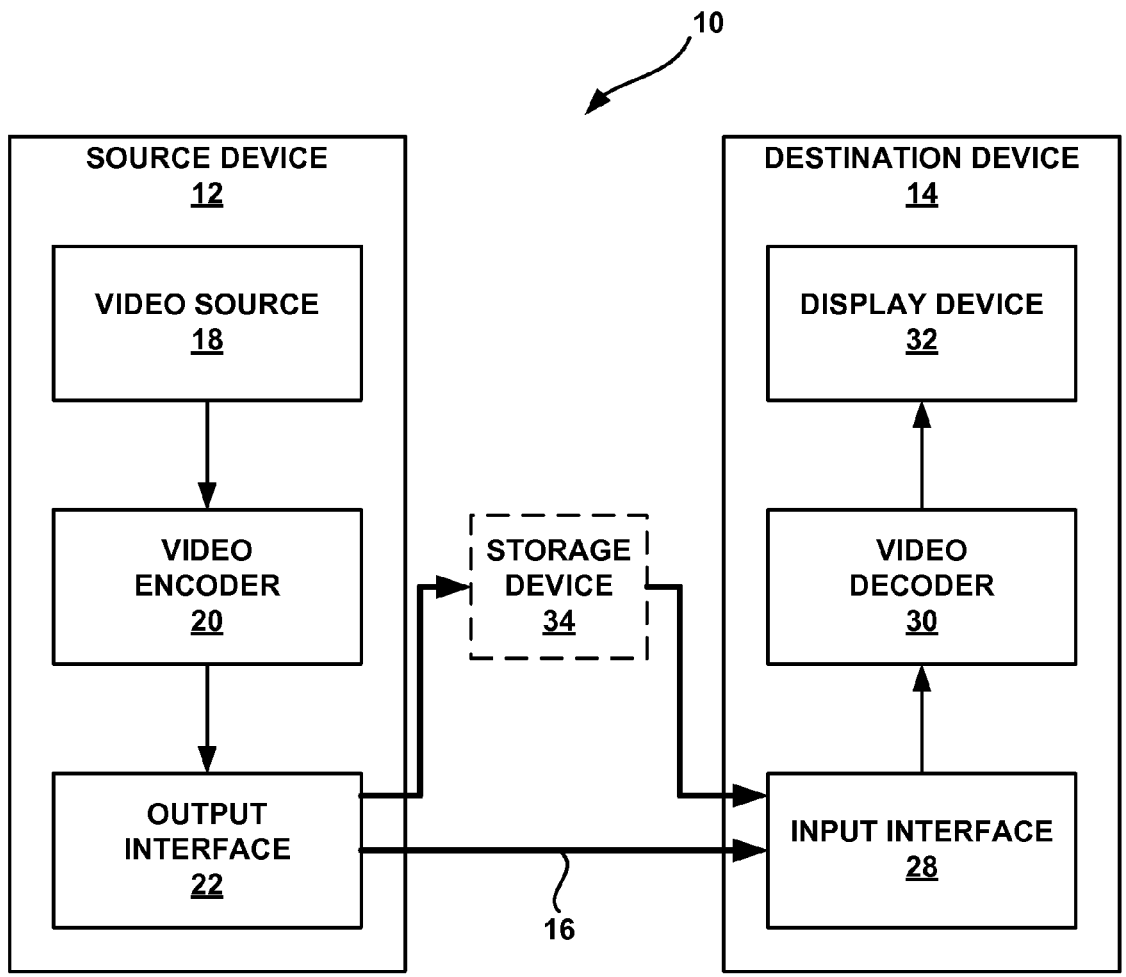
FIG. 3 is a block diagram illustrating an example video encoding and decoding system that may utilize the techniques described in this disclosure.

FIG. 3 is a block diagram illustrating an example video encoding and decoding system 10 that may utilize the techniques described in this disclosure. As shown in FIG. 3, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. Source device 12 may modulate the encoded video data according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, link 16 may include an intermediate device (not shown), such as a media aware network element (MANE), that receives bitstreams from source device 12 and another source device (or two bitstreams from source device 12). The MANE may splice the two bitstreams together, then forward the spliced bitstream to destination device 14. In accordance with the techniques of this disclosure, the MANE may determine whether a parameter set of the second bitstream has the same ID as a parameter set of the first bitstream, and if so, assign a unique parameter set ID to the parameter set of the second bitstream, then send the parameter set to destination device 14 out-of-band.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 3, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

In some examples in accordance with the techniques of this disclosure a video source 18 may generate one or more bitstreams. For example, if video source is a video capture device the video capture device may generate two or more bitstreams. In another example, the video source 18 might include two or more source device generating one bitstream each. These bitstreams may be spliced together.

Accordingly, a processor within video source 18 may determine if a parameter set ID of a first parameter set of a first bitstream is the same as a parameter set ID of a first parameter set of a second bitstream. In response to the parameter set ID of the second bitstream matching the parameter set ID of the first bitstream, the processor may change the parameter set ID of the second bitstream to a unique parameter set ID. Video source 18 may then transmit a new parameter set associated with the unique parameter set ID.

Video encoder 20 may encode the captured, pre-captured, or computer-generated video. For example, video encoder 20 may encode the spliced bitstreams. Additionally, in some examples, video decoder 30 may differentiate between the first bitstream and the second bitstream based on the parameter set ID of the first bitstream and the unique parameter set ID. In other examples, output interface 22 of source device 12 may transmit the encoded video data directly to destination device 14 via. The encoded video data may also (or alternatively) be stored onto storage device 34 for later access by destination device 14 or other devices, for decoding and/or playback.

In some examples in accordance with the techniques of this disclosure, some other video processing device, such as a media aware network element (MANE) may splice two or more bitstreams together. Accordingly, a processor within the MANE or other video processing device may determine if a parameter set ID of a first parameter set of a first bitstream is the same as a parameter set ID of a first parameter set of a second bitstream. In response to the parameter set ID of the second bitstream matching the parameter set ID of the first bitstream, the processor may change the parameter set ID of the second bitstream to a unique parameter set ID. The MANE or other video processing device may then transmit a new parameter set associated with the unique parameter set ID.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. In some examples in accordance with the techniques of this disclosure video decoder 30 may decode a spliced bitstream. A video processing device may generate the spliced bitstream. Accordingly, a processor within the video processing device may have determined if a parameter set ID of a first parameter set of a first bitstream is the same as a parameter set ID of a first parameter set of a second bitstream. In response to the parameter set ID of the second bitstream matching the parameter set ID of the first bitstream, the processor may have changed the parameter set ID of the second bitstream to a unique parameter set ID. The video processing device may then transmit a new parameter set associated with the unique parameter set ID. The spliced bitstream may be encoded by video encoder 20, transmitted by output interface 22, received by input interface 28 and decoded by decoder 30. Display device 32 may then display this spliced bitstream. In some examples, the video decoder 30 may differentiate between the first bitstream and the second bitstream based on the parameter set ID of the first bitstream and the unique parameter set ID.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of the HEVC standard, referred to as "HEVC Working Draft 9" or "WD9," is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, C N, 10-19 Oct. 2012, which, as of Dec. 27, 2012, is downloadable from http://phenix.int-evry.fr/jct/doc_en-d_user/documents/11_Shanghai/wg11/JCTVC-K1003-v13.zip, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 3, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 4:
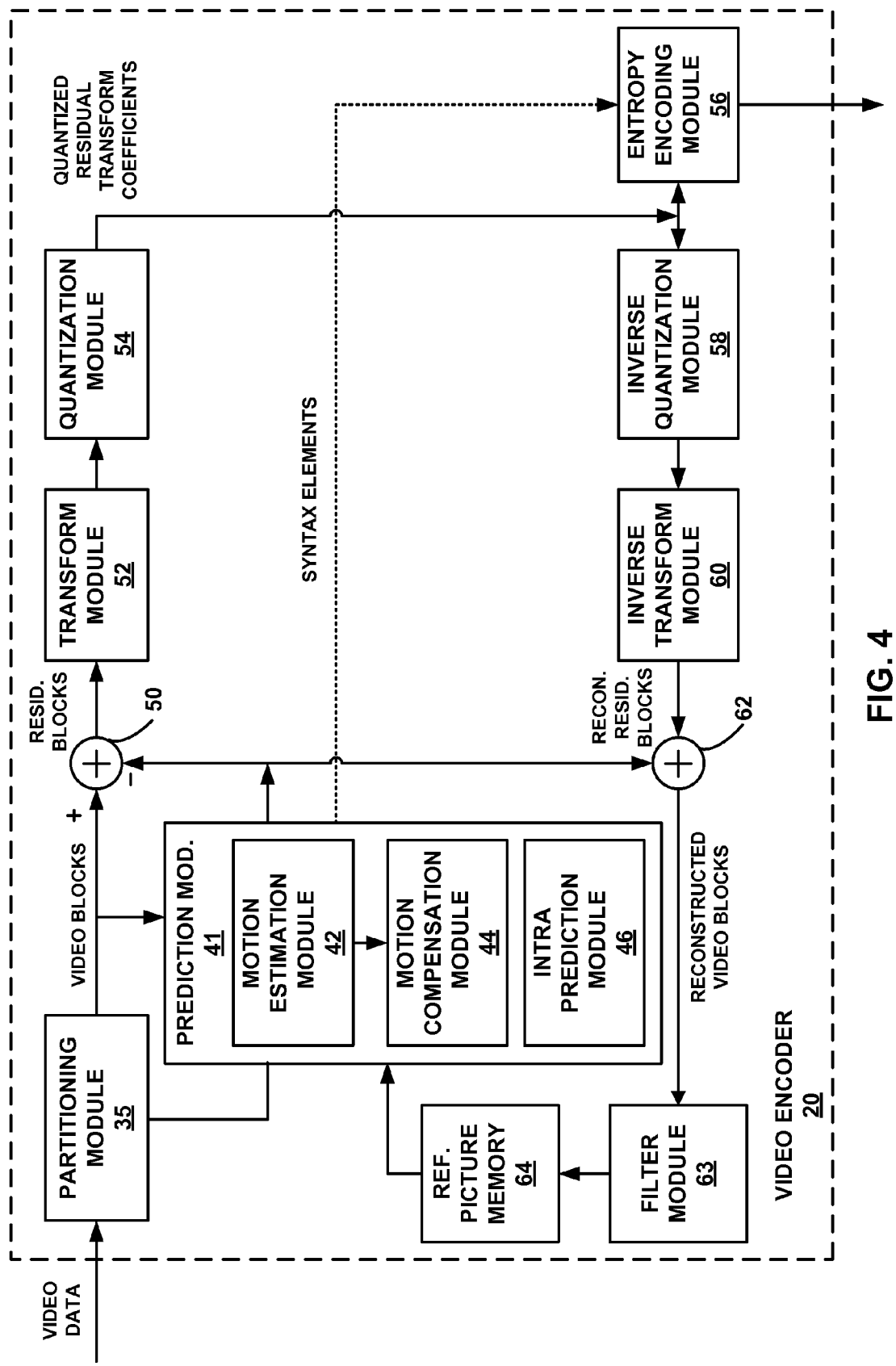
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In some examples, within the context of a bitstream, parameter set IDs may be uniquely assigned, unless the intention is to overwrite a previously transmitted parameter set. In addition, video encoder 20 may be configured to encode two bitstreams including data representative of the same content, but formatted differently (e.g., a base profile and a high profile of HEVC, one 720p version and one 1080p version, or the like). Likewise, when encoding two different sets of media content, video encoder 20 may reuse parameter set IDs, because two different media streams resulting from such media content do not conflict (in other words, video encoder 20 may "reset" a parameter set ID counter when beginning to encode a different set of media content). In some examples, it is possible to let the two bitstreams share the same parameter set ID value space—i.e. not to reuse parameter set IDs.

In the example of FIG. 4, video encoder 20 includes a partitioning module 35, prediction module 41, filter module 63, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. Filter module 63 is intended to represent one or more loop filters such as a deblocking filter, an adaptive loop filter (ALF), and a sample adaptive offset (SAO) filter. Although filter module 63 is shown in FIG. 4 as being an in loop filter, in other configurations, filter module 63 may be implemented as a post loop filter.

As shown in FIG. 4, video encoder 20 receives video data, and partitioning module 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. Video encoder 20 may divide the slice into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices, B slices or GPB slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy coding module 56. Entropy coding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

In this manner, video encoder 20 of FIG. 4 represents an example of a video encoder configured to encode parameter set IDs coded according to the techniques of this disclosure.

In an example method of encoding video data, video encoder 20 may receive a new parameter set associated with a unique parameter set ID, wherein a device transmitting the new parameter set associated with the unique parameter set ID has (1) determined if a parameter set ID of a first parameter set of a first bitstream is the same as a parameter set ID of a first parameter set of a second bitstream, (2) in response to the parameter set ID of the second bitstream matching the parameter set ID of the first bitstream, changing the parameter set ID of the second bitstream to a unique parameter set ID, and (3) transmitting the new parameter set associated with the unique parameter set ID. Video encoder 20 may also differentiate between the first bitstream and the second bitstream based on the parameter set ID of the first bitstream and the unique parameter set ID. In some examples, the receiving occurs out-of-band.

Figure 5:
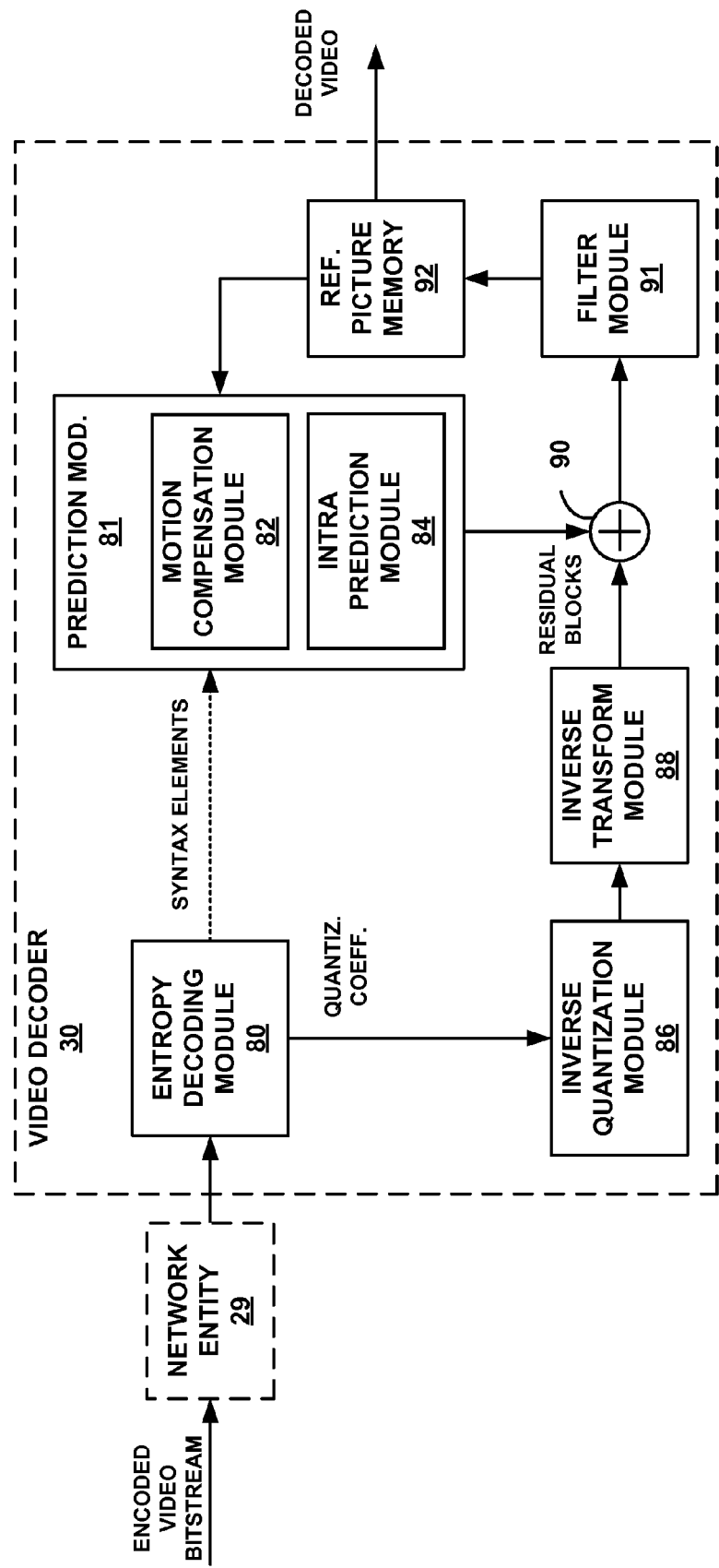
FIG. 5 is a block diagram illustrating an example video decoder that may implement the techniques described in this disclosure.

FIG. 5 is a block diagram illustrating an example video decoder 30 that may implement the techniques described for enhanced support of stream adaptation and splicing based on CRA pictures described above. In an example, if video decoder 30 receives a parameter set having the same parameter set ID of a previously received parameter set, video decoder 30 may be configured to overwrite the previous parameter set with the new parameter set. Thus, video decoder 30 may decode video data referring to the parameter set ID preceding the new parameter set (in decoding order) using the previous parameter set having that ID, but decode video data referring to the parameter set ID following the new parameter set (in decoding order) using the new parameter set. In accordance with the techniques of this disclosure, by receiving a parameter set out-of-band having a unique ID, video decoder 30 may be able to differentiate references to the parameter set received out-of-band and another parameter set received in band. In some examples, video decoder 30 is able to decode a spliced bitstream and receive an SPS out-of-band, as a result of the modification to the SPS ID for the out-of-band SPS by an upstream device.

In the example of FIG. 5, video decoder 30 includes an entropy decoding module 80, prediction module 81, inverse quantization module 86, inverse transformation module 88, summer 90, filter module 91, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a MANE, a video editor/splicer, or other such device configured to implement one or more of the techniques described above. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, loop filters (either in the coding loop or after the coding loop) may also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although filter module 91 is shown in FIG. 5 as being an in loop filter, in other configurations, filter module 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 3.

In this manner, video decoder 30 of FIG. 5 represents an example of a video decoder configured to decoder parameter set IDs coded according to the techniques of this disclosure.

Figure 6:
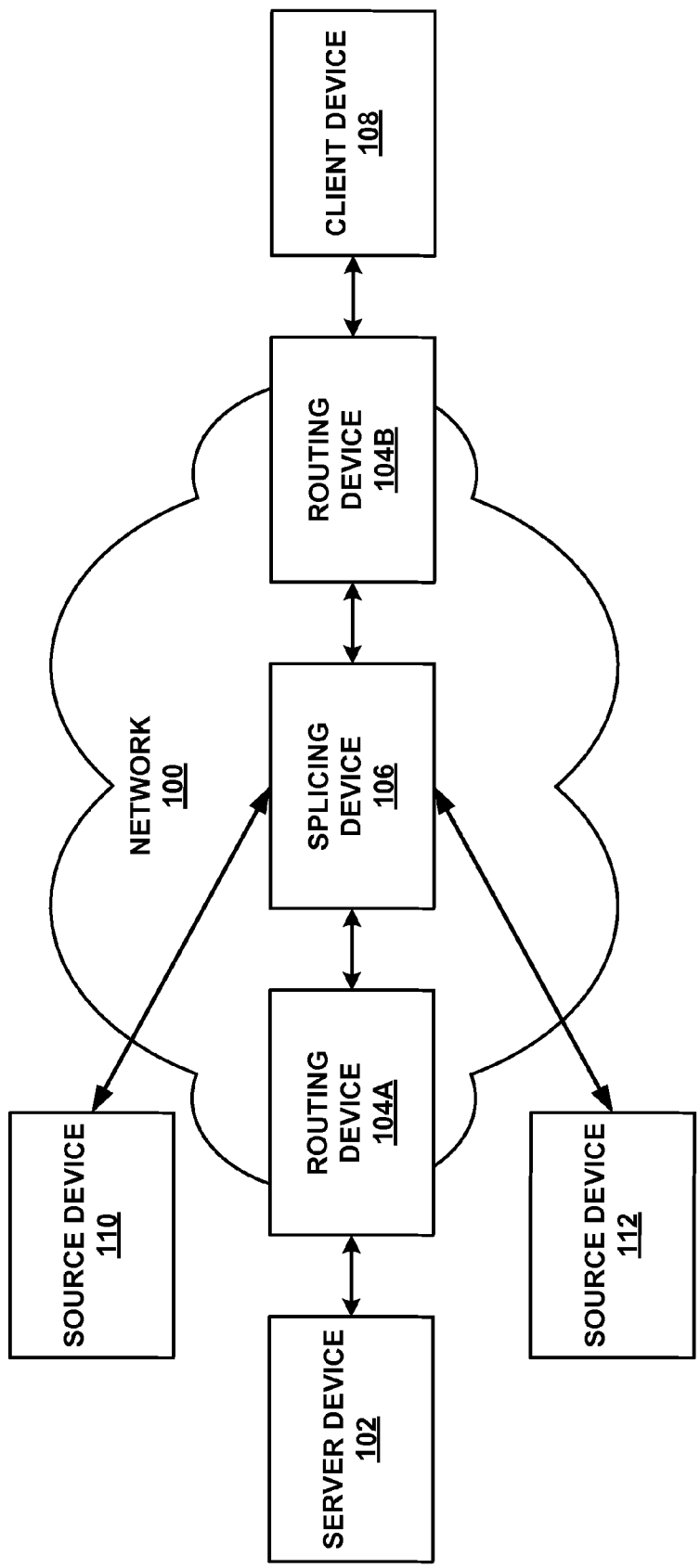
FIG. 6 is a block diagram illustrating an example set of devices that form part of a network.

FIG. 6 is a block diagram illustrating an example set of devices that form part of network 100. In this example, network 100 includes routing devices 104A, 104B (routing devices 104), splicing device 106, and source devices 110, 112. Routing devices 104 and splicing device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 3), while client device 108 may correspond to destination device 14 (FIG. 3), in some examples. Source devices 110, 112, may provide one or more bitstreams, such as video data, that may be spliced together. For example, source device 110 may provide a first bitstream and source device 112 may provide a second bitstream. In some examples, the first and second bitstream may be spliced together by splicing device 106.

In general, routing devices 104 implement one or more routing protocols to exchange network data through network 100. In some examples, routing devices 104 may be configured to perform proxy or cache operations. Therefore, in some examples, routing devices 104 may be referred to as proxy devices as well. In general, routing devices 104 execute routing protocols to discover routes through network 100. By executing such routing protocols, routing device 104B may discover a network route from itself to server device 102 via routing device 104A.

The techniques of this disclosure may be implemented by network devices such as routing devices 104 and splicing device 106. In various examples, client device 108 may be configured to receive and process bitstreams spliced in accordance with the techniques of this disclosure. In this manner, routing devices 104, splicing device 106, and client device 108 represent examples of devices configured to determine if a parameter set ID of a first parameter set of a first bitstream is the same as a parameter set ID of a first parameter set of a second bitstream; in response to the parameter set ID of the second bitstream matching the parameter set ID of the first bitstream, change the parameter set ID of the second bitstream to a unique parameter set ID; and transmit a new parameter set associated with the unique parameter set ID. The transmission may occur out-of-band. One or more of the parameter set ID of the first bitstream, the parameter set ID of the second bitstream, and the unique parameter set ID may be re coded using fixed length codes. The parameter set ID of the first bitstream may be associated with a particular parameter type, e.g., one of a sequence parameter set type, a picture parameter set type, an adaptation parameter set type, or other type of parameter set, and the parameter set ID of the second bitstream may be associated with a parameter set of the same type as the parameter set ID of the first bitstream. The first bitstream may comprise coded video data for one or more coded pictures preceding a splicing point, and the second bitstream may comprise coded video data for one or more coded pictures after the splicing point.

In some examples in accordance with the techniques of this disclosure, a video source such as server device 102 may generate one or more bitstreams. The different bitstreams may provide for channel change requests by client device 108, differences in video quality for the same video programing, e.g., a higher quality video signal that may use more bandwidth or a lower quality video signal that may use less bandwidth or use bandwidth more efficiently. The different bitstreams may provide for commercial or other temporary transmissions that might be used in conjunction with a main video signal. A processor within, for example, server device 102, routing devices 104A/B, or splicing device 106 may determine if a parameter set ID of a first parameter set of a first bitstream is the same as a parameter set ID of a first parameter set of a second bitstream. This may be because bitstreams often uses few SPSs or even just one SPS. Bitstreams may use the smallest SPS ID value 0. In this case, if two bitstreams or parts thereof are spliced, it is likely that the same SPS ID is referred to by the splicing point and by the picture immediately preceding the spicing point picture when actually two different SPS may be used. In response to the parameter set ID of the second bitstream matching the parameter set ID of the first bitstream, the processor may change the parameter set ID of the second bitstream to a unique parameter set ID. One of the server device 102, routing devices 104A/B, or splicing device 106 may then transmit a new parameter set associated with the unique parameter set ID.

Figure 7:
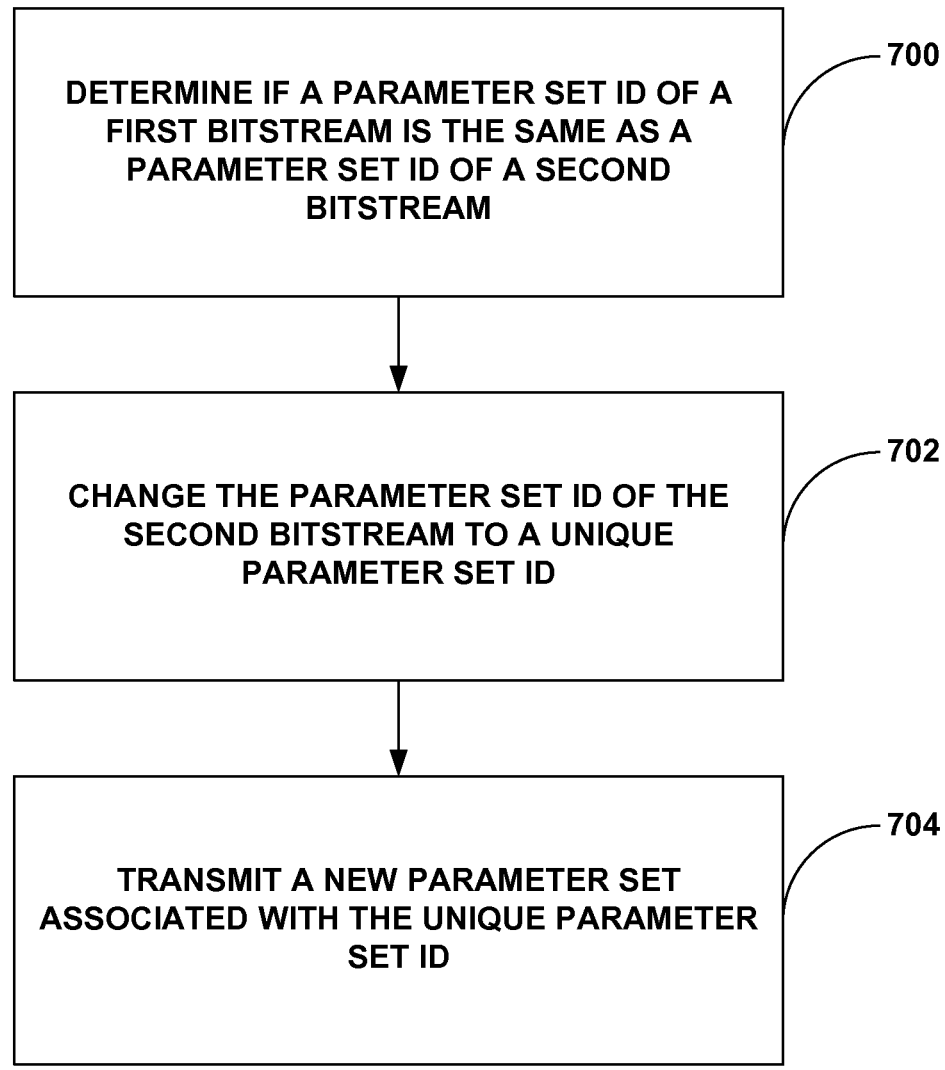
FIG. 7 is a flow diagram illustrating an example method implementing one or more aspects of this disclosure.

FIG. 7 is a flow diagram illustrating an example method implementing one or more aspects of this disclosure. In some examples in accordance with the techniques of this disclosure, some other video processing device, such as a MANE may splice two or more bitstreams together. Accordingly, a processor within the MANE or other video processing device may determine whether a first parameter set ID of a first parameter set of a first bitstream is the same as a second parameter set ID of a first parameter set of a second bitstream (700). In response to the parameter set ID of the second bitstream matching the parameter set ID of the first bitstream, the processor may change the parameter set ID of the second bitstream to a unique parameter set ID (702). The MANE or other video processing device may then transmit a new parameter set associated with the unique parameter set ID (704). This may allow for splicing two bitstreams while also ensuring that, e.g., a decoder is capable of differentiating between parameter sets of the spliced bitstreams.

Figure 8:
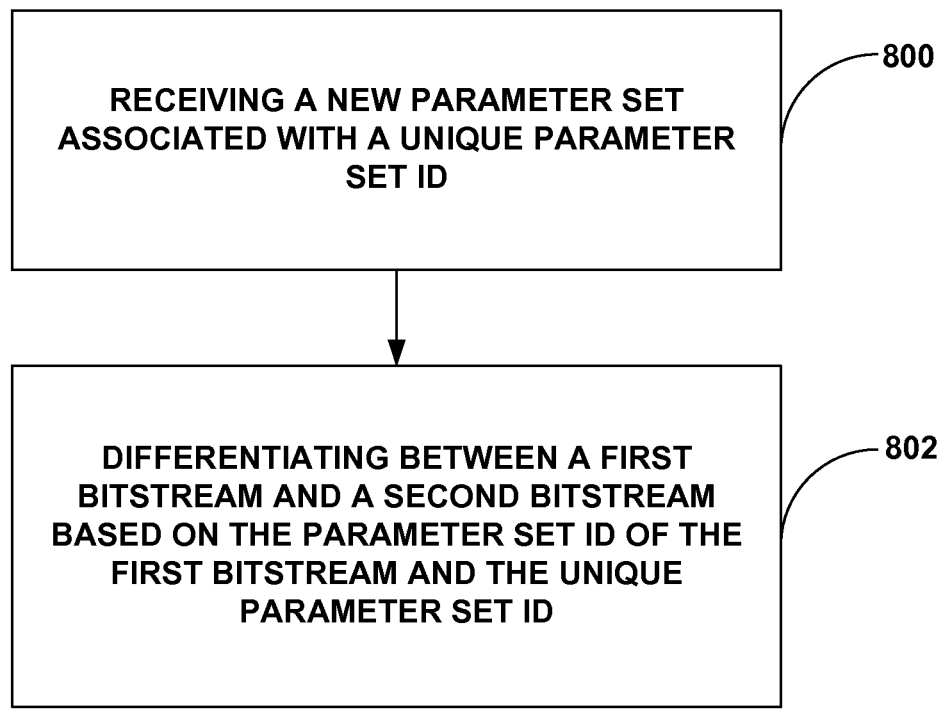
FIG. 8 is a flow diagram illustrating another example method implementing one or more aspects of this disclosure.

FIG. 8 is a flow diagram illustrating another example method to implement one or more aspects of this disclosure. In an example a video coder video processing device may receive a new parameter set associated with a unique parameter set ID (800).

The new parameter set received may have been transmitted from a device such as a MANE. The device, e.g., MANE, may transmit the new parameter set associated with the unique parameter set ID. This may occur, for example, when the device determines that a parameter set ID of a first parameter set of a first bitstream is the same as a parameter set ID of a second parameter set of a second bitstream. The transmission of the new parameter set associated with the unique parameter set ID may be in response to the parameter set ID of the second bitstream matching the parameter set ID of the first bitstream. Accordingly, such a device may change the parameter set ID of the second bitstream to a unique parameter set ID, and transmit the new parameter set associated with the unique parameter set ID.

The video coder, e.g., video decoder 30 or video processing device may differentiate between the first bitstream and the second bitstream based on the parameter set ID of the first bitstream and the unique parameter set ID (802).

Figure 9:
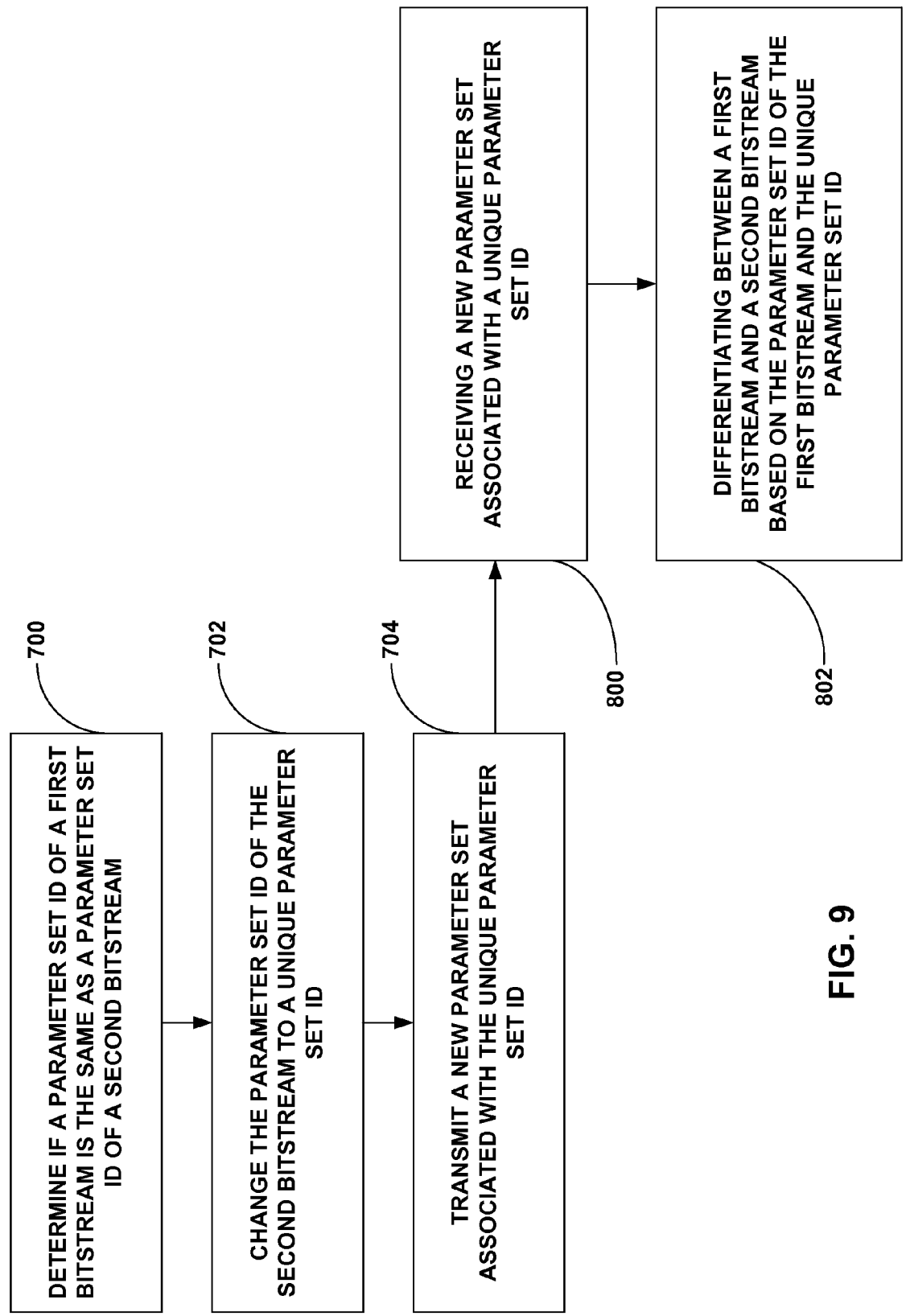
FIG. 9 is a flow diagram illustrating another example method implementing one or more aspects of this disclosure.

FIG. 9 is a flow diagram illustrating an example of the interactions between the method of FIG. 7 and the method of FIG. 8 in accordance with aspects of this disclosure. In the illustrated example in accordance with the techniques of this disclosure, some other video processing device, such as a MANE may splice two or more bitstreams together. Accordingly, a processor within the MANE or other video processing device may determine if a parameter set ID of a first parameter set of a first bitstream is the same as a parameter set ID of a first parameter set of a second bitstream (700). In response to the parameter set ID of the second bitstream matching the parameter set ID of the first bitstream, the processor may change the parameter set ID of the second bitstream to a unique parameter set ID (702). The MANE or other video processing device may then transmit a new parameter set associated with the unique parameter set ID (704).

The new parameter set transmitted by the MANE or other video processing device may be received by a video coder, such as video encoder 20 or video decoder 30 (800). The video coder (e.g., video encoder 20 and/or video decoder 30) may differentiate between the first bitstream and the second bitstream based on the parameter set ID of the first bitstream and the unique parameter set ID (802).

Figure 10:
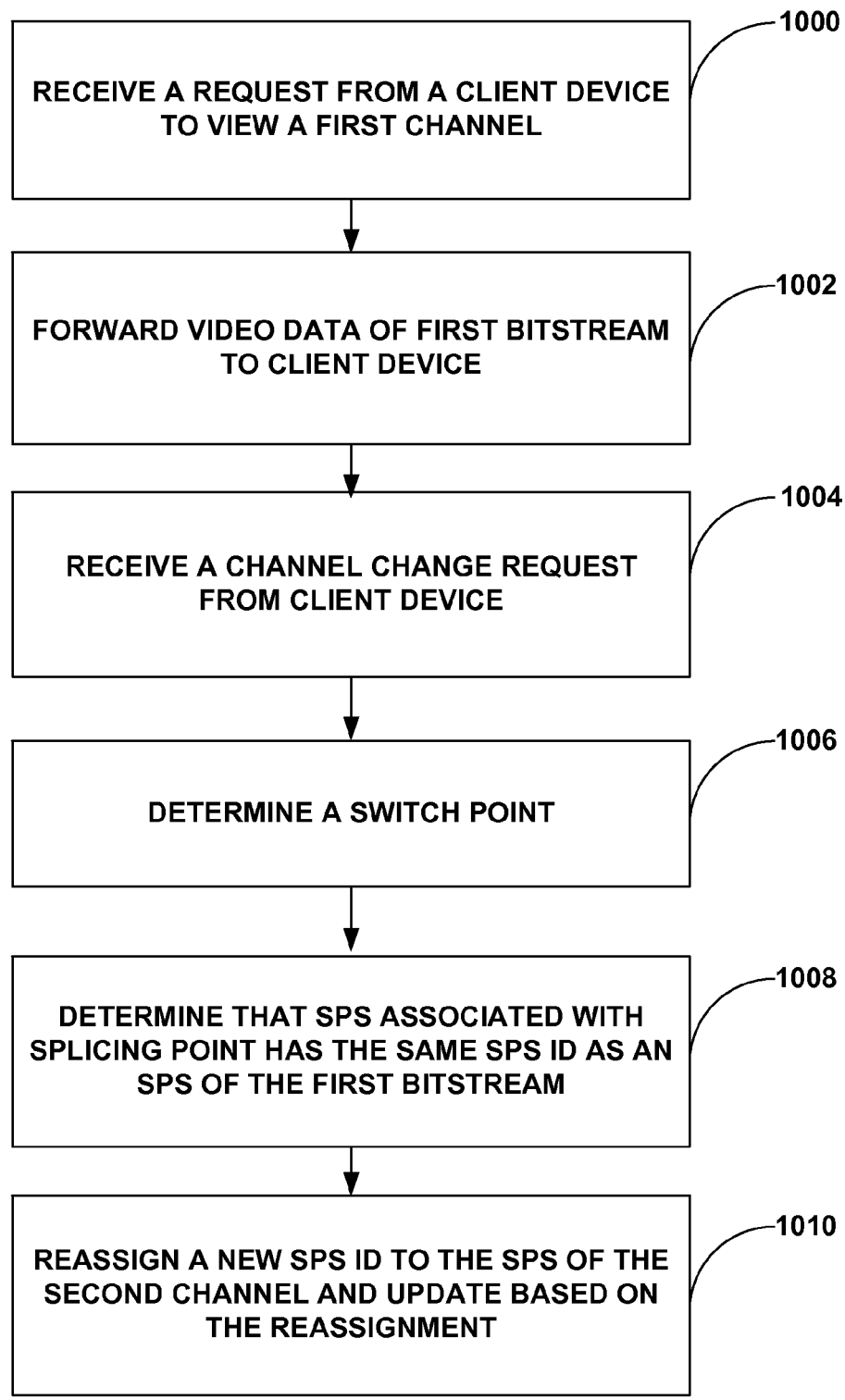
FIG. 10 is a flow diagram illustrating an example method implementing one or more aspects of this disclosure.

FIG. 10 is a flow diagram illustrating an example method implementing one or more aspects of this disclosure from the perspective of a splicing device such as splicing device 106 illustrated in FIG. 6. Splicing device 106 receives a request from a client device 108 to view a first channel (1000). The first channel may be, for example, video data.

Splicing device 106 forwards video data of first bitstream (corresponding to first channel) to client device 108 in response to this request (1002). Later, splicing device 106 may receive a channel change request from client device 108 to view second channel (1004). The second channel may be, for example, a completely different program or the same program, but a different video quality.

Splicing device 106 determines a switch point (e.g., IDR) picture within second bitstream (corresponding to second channel) to use as a splicing point (1006). A switch point may correspond to, for example, a random access point (RAP), such as an instantaneous decoder refresh (IDR) picture, a clean random access (CRA) picture, a broken link access (BLA) picture, or the like. A switch point may be considered a splicing point when the switch point is used to splice two separate video bitstreams into one single bitstream. In this example, splicing device 106 determines that SPS associated with splicing point has the same SPS ID as an SPS of the first bitstream (1008). In general, splicing device 106 determines whether the SPS associated with the splicing point has the same SPS ID as an SPS of the first bitstream, and if not, need not take any action with respect to the SPS.

On the other hand, based on the determination that the SPS ID is the same as an SPS of the first bitstream, the splicing device 106 may (1) reassign a new SPS ID to the SPS of the second channel, (2) forward the SPS having the new SPS ID to the client device out of band, (3) update references to the SPS ID in video data of the second channel to refer to the new SPS ID, and (4) forward video data of the second bitstream to the client device, such that the bitstream forwarded to the client device forms a spliced bitstream including data from the first bitstream preceding the switch point, and data from the second bitstream following the switch point (1010).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a first syntax structure comprising a first parameter set having a parameter set identifier (ID) that is fixed length coded, wherein the parameter set ID of the first parameter set is before any syntax element in the first parameter set that is entropy coded, and wherein receiving the first parameter set comprises receiving a network abstraction layer (NAL) unit including the first parameter set and not including any coded video data;
   receiving a second syntax structure, wherein a reference in the second syntax structure to the first parameter set ID is fixed length coded and before any syntax element in the second syntax structure that is entropy coded; and
   using the first parameter set and the second syntax structure to decode video data.

2. The method of claim 1, further comprising determining the number of bits for the fixed length coding based on a signaling received.

3. The method of claim 1, further comprising receiving a spliced bitstream comprising a first bitstream and a second bitstream spliced together, wherein the first bitstream comprises the parameter set ID of the first parameter set and the second bitstream comprises a parameter set ID of a second parameter set and wherein the parameter set ID of the first parameter set is unique from the parameter set ID of the second parameter set.

4. The method of claim 3, further comprising decoding one or more of the parameter set ID of the first parameter set of the first bitstream and the parameter set ID of the second parameter set of the second bitstream.

5. The method of claim 3, wherein the spliced bitstream comprises video data of the first bitstream preceding a splicing point and video data of the second bitstream after the splicing point.

6. A method of encoding video data, the method comprising:
   forming a first syntax structure comprising a first parameter set having a parameter set ID that is fixed length coded, wherein the parameter set ID of the first parameter set is before any syntax element in the first parameter set that is entropy coded, and wherein receiving the first parameter set comprises receiving a network abstraction layer (NAL) unit including the first parameter set and not including any coded video data;
   forming a second syntax structure, wherein a reference in the second syntax structure to the first parameter set ID is fixed length coded and before any syntax element in the second syntax structure that is entropy coded; and
   using the first parameter set and the second syntax structure to encode video data.

7. The method of claim 6, further comprising signaling the number of bits for the fixed length coding of the ID.

8. The method of claim 6, further comprising transmitting a spliced bitstream comprising a first bitstream and a second bitstream spliced together, wherein the first bitstream comprises the parameter set ID of the first parameter set and the second bitstream comprises a parameter set ID of a second parameter set and wherein the parameter set ID of the first parameter set is unique from the parameter set ID of the second parameter set.

9. The method of claim 8, further comprising encoding one or more of the parameter set ID of the first parameter set of the first bitstream and the parameter set ID of the second parameter set of the second bitstream.

10. The method of claim 8, wherein the spliced bitstream comprises video data of the first bitstream preceding a splicing point and video data of the second bitstream after the splicing point.

11. An apparatus for processing video data, the apparatus comprising:
    one or more processors configured to:
       process a first syntax structure comprising a first parameter set having a parameter set identifier (ID) that is fixed length coded, wherein the parameter set ID of the first parameter set is before any syntax element in the first parameter set that is entropy coded, and wherein receiving the first parameter set comprises receiving a network abstraction layer (NAL) unit including the first parameter set and not including any coded video data;
       processes a second syntax structure, wherein a reference in the second syntax structure to the first parameter set ID is fixed length coded and before any syntax element in the second syntax structure that is entropy coded; and
       use the first parameter set and second syntax structure to decode video data.

12. The apparatus of claim 11, wherein the one or more processors are further configured to determine the number of bits for the fixed length coding based on a signaling received.

13. The apparatus of claim 11, wherein the one or more processors are further configured to receive a spliced bitstream comprising a first bitstream and a second bitstream spliced together, wherein the first bitstream comprises the parameter set ID of the first parameter set and the second bitstream comprises a parameter set ID of a second parameter set and wherein the first parameter set ID of the first parameter set is unique from the second parameter set ID of the second parameter set.

14. The apparatus of claim 13, wherein the one or more processors are further configured to code one or more of the parameter set ID of the first parameter set of the first bitstream and the parameter set ID of the second parameter set of the second bitstream.

15. The apparatus of claim 13, wherein the spliced bitstream comprises video data of the first bitstream preceding a splicing point and video data of the second bitstream after the splicing point.

16. An apparatus for processing video data, the apparatus comprising:
    means for processing a first syntax structure comprising a first parameter set having a parameter set identifier (ID) that is fixed length coded, wherein the parameter set ID of the first parameter set is before any syntax element in the first parameter set that is entropy coded, and wherein receiving the first parameter set comprises receiving a network abstraction layer (NAL) unit including the first parameter set and not including any coded video data;
    means for processing a second syntax structure, wherein a reference in the second syntax structure to the first parameter set ID is fixed length coded and before any syntax element in the second syntax structure that is entropy coded; and
    means for using the first parameter set and second syntax structure to code video data.

17. A computer-readable storage medium having stored thereon instructions that, when executed, cause one or more processors of a device to:

processes a first syntax structure comprising a first parameter set having a parameter set identifier (ID) that is fixed length coded, wherein the parameter set ID of the first parameter set is before any syntax element in the first parameter set that is entropy coded, and wherein receiving the first parameter set comprises receiving a network abstraction layer (NAL) unit including the first parameter set and not including any coded video data;

process a second syntax structure, wherein a reference in the second syntax structure to the first parameter set ID is fixed length coded and before any syntax element in the second syntax structure that is entropy coded; and use the first parameter set and second syntax structure to code video data.

18. A method of processing video data, the method comprising:

determining whether a first parameter set identifier (ID) of a first parameter set of a first bitstream is the same as a second parameter set ID of a second parameter set of a second bitstream;

in response to determining that the second parameter set ID is the same as the first parameter set ID, changing the second parameter set ID to a unique parameter set ID; and transmitting a parameter set associated with the unique parameter set ID.

19. The method of claim 18, wherein transmitting comprises transmitting the parameter set associated with the unique parameter set ID out-of-band relative to transmission of a spliced bitstream resulting from splicing the first bitstream with the second bitstream.

20. The method of claim 18, further comprising coding one or more of the parameter set ID of the first parameter set of the first bitstream, the parameter set ID of the second parameter set of the second bitstream, and the unique parameter set ID using fixed length codes.

21. The method of claim 18, wherein the parameter set ID of the first parameter set of the first bitstream and the parameter set ID of the second parameter set of the second bitstream comprise one of a sequence parameter set, a picture parameter set, and an adaptation parameter set.

22. The method of claim 18, wherein a spliced bitstream comprises video data of the first bitstream preceding a splicing point and video data of the second bitstream after the splicing point.

23. The method of claim 18, wherein the method is performed by a video processing device.

24. The method of claim 23, wherein the video processing device comprises one of a client device comprising a video decoder, a multiplexing unit, a video pre-processing device, a processor, a web browser executed by a processors, a router, or a device of a content delivery network.

25. The method of claim 23, further comprising splicing the first bitstream and the second bitstream together.

26. The method of claim 18, further comprising updating references to the second parameter set ID in associated coded video data for the second bitstream such that the references are directed to the unique parameter set ID instead.

27. An apparatus for processing video data, the apparatus comprising:

one or more processors configured to:

determine whether a first parameter set ID of a first parameter set of a first bitstream is the same as a second parameter set ID of a second parameter set of a second bitstream;

in response to determining that the second parameter set ID is the same as the first parameter set ID, changing the second parameter set ID to a unique parameter set ID; and transmit a parameter set associated with the unique parameter set ID.

28. The apparatus of claim 27, wherein transmitting comprises transmitting the parameter set associated with the unique parameter set ID out-of-band relative to transmission of a spliced bitstream resulting from splicing the first bitstream with the second bitstream.

29. The apparatus of claim 27, wherein the one or more processors are further configured to code one or more of the parameter set ID of the first parameter set of the first bitstream, the parameter set ID of the second parameter set of the second bitstream, and the unique parameter set ID using fixed length codes.

30. The apparatus of claim 27, wherein the parameter set ID of the first parameter set of the first bitstream and the parameter set ID of the second parameter set of the second bitstream comprise one of a sequence parameter set, a picture parameter set, and an adaptation parameter set type.

31. The apparatus of claim 27, wherein a spliced bitstream comprises video data of the first bitstream preceding a splicing point and video data of the second bitstream after the splicing point.

32. The apparatus of claim 27, wherein the apparatus comprises a video processing device.

33. The apparatus of claim 32, wherein the video processing device comprises one of a client device comprising a video decoder, a multiplexing unit, a video pre-processing device, a processor, a web browser executed by a processors, a router, or a device of a content delivery network.

34. The apparatus of claim 32, wherein the one or more processors is further configured to update references to the second parameter set ID in associated coded video data for the second bitstream such that the references are directed to the unique parameter set ID instead.

35. The apparatus of claim 32, wherein the video processing device comprises a media aware network element (MANE).

36. The apparatus of claim 32, wherein the one or more processors is further configured to splice the first bitstream and the second bitstream together.

37. An apparatus for processing video data, the apparatus comprising:

means for determining whether a first parameter set ID of a first parameter set of a first bitstream is the same as a second parameter set ID of a second parameter set of a second bitstream;

means for changing second the parameter set ID to a unique parameter set ID in response to determining that the second parameter set ID is the same as the first parameter set ID; and means for transmitting a parameter set associated with the unique parameter set ID.

38. The apparatus of claim 37, wherein transmitting comprises transmitting the parameter set associated with the unique parameter set ID out-of-band relative to transmission of a spliced bitstream resulting from splicing the first bitstream with the second bitstream.

39. The apparatus of claim 37, further comprising means for coding one or more of the parameter set ID of the first parameter set of the first bitstream, the parameter set ID of the second parameter set of the second bitstream, and the unique parameter set ID using fixed length codes.

40. The apparatus of claim 37, wherein the parameter set ID of the first parameter set of the first bitstream and the parameter set ID of the second parameter set of the second bitstream comprise one of a sequence parameter set, a picture parameter set, and an adaptation parameter set.

41. The apparatus of claim 37, wherein a spliced bitstream comprises video data of the first bitstream preceding a splicing point and video data of the second bitstream after the splicing point.

42. A nontransitory computer-readable storage medium having stored thereon instructions that, when executed, cause one or more processors of a device to:
 determine whether a first parameter set ID of a first parameter set of a first bitstream is the same as a second parameter set ID of a second parameter set of a second bitstream;
 in response to determining that the second parameter set ID is the same as the first parameter set ID, change the second parameter set ID to a unique parameter set ID; and
 transmit a parameter set associated with the unique parameter set ID.

43. The computer-readable storage medium of claim 42, wherein transmitting comprises transmitting the parameter set associated with the unique parameter set ID out-of-band relative to transmission of a spliced bitstream resulting from splicing the first with the second bitstream.

44. The computer-readable storage medium of claim 42, further comprising instructions causing the one or more processors to code one or more of the parameter set ID of the first parameter set of the first bitstream, the parameter set ID of the second parameter set of the second bitstream, and the unique parameter set ID using fixed length codes.

45. The computer-readable storage medium of claim 42, wherein the parameter set ID of the first parameter set of the first bitstream and the parameter set ID of the second parameter set of the second bitstream comprise one of a sequence parameter set, a picture parameter set, and an adaptation parameter set.

46. The computer-readable storage medium of claim 42, wherein a spliced bitstream comprises video data of the first bitstream preceding a splicing point and video data of the second bitstream after the splicing point.

* * * * *